United States Patent
Then et al.

(10) Patent No.: US 7,635,256 B2
(45) Date of Patent: Dec. 22, 2009

(54) HOUSING FOR AN ELECTRIC MACHINE WITH AUXILIARY VENTILATION

(75) Inventors: Thomas Then, Bad Neustadt (DE); Michael Zisler, Euerdorf-Wirmsthal (DE)

(73) Assignee: Siemens Aktiengesellschaft, München (DE)

( * ) Notice: Subject to any disclaimer, the term of this patent is extended or adjusted under 35 U.S.C. 154(b) by 448 days.

(21) Appl. No.: 10/988,986

(22) Filed: Nov. 15, 2004

(65) Prior Publication Data
US 2005/0104458 A1 May 19, 2005

(30) Foreign Application Priority Data
Nov. 14, 2003 (DE) ................ 103 53 330

(51) Int. Cl.
*F04B 17/00* (2006.01)
*H02K 5/22* (2006.01)

(52) U.S. Cl. .............. 417/423.14; 417/360; 417/372; 310/58; 310/60 A; 310/89

(58) Field of Classification Search ............ 417/423.14, 417/360, 366, 372; 310/58, 63, 89, 90, 154.12, 310/154.13, 60 A, 60 R; *H02K 5/04, 5/20, H02K 5/22*
See application file for complete search history.

(56) References Cited

U.S. PATENT DOCUMENTS

| | | | | |
|---|---|---|---|---|
| 3,461,328 A | * | 8/1969 | Drouard ...................... 310/52 |
| 4,191,245 A | * | 3/1980 | Wendt et al. .................. 165/69 |
| 4,244,098 A | | 1/1981 | Barcus |
| 5,714,816 A | * | 2/1998 | Jensen et al. .................. 310/89 |
| 5,747,900 A | * | 5/1998 | Nakamura et al. ............ 310/58 |
| 6,011,331 A | * | 1/2000 | Gierer et al. .................. 310/58 |
| 6,437,469 B1 | * | 8/2002 | Davis et al. ................... 310/64 |
| 6,522,036 B1 | * | 2/2003 | Chen ........................... 310/58 |
| 7,156,191 B2 | * | 1/2007 | Lau ............................ 173/216 |
| 2003/0102740 A1 | * | 6/2003 | Marioni ....................... 310/87 |
| 2003/0117028 A1 | * | 6/2003 | Agnes et al. .............. 310/68 R |
| 2004/0000821 A1 | * | 1/2004 | Ciciliani et al. ............... 310/52 |

FOREIGN PATENT DOCUMENTS

| | | |
|---|---|---|
| DE | 80 24 246 U1 | 1/1981 |
| DE | 8414158 U1 | 1/1988 |
| DE | 201 21 314 U1 | 7/2002 |
| DE | 10247199 A1 * | 4/2004 |
| EP | 0 433 247 A1 | 6/1991 |
| JP | 10215541 A | 8/1998 |

* cited by examiner

*Primary Examiner*—Devon C Kramer
*Assistant Examiner*—Leonard J Weinstein
(74) *Attorney, Agent, or Firm*—Henry M. Feiereisen; Ursula B. Day

(57) ABSTRACT

A fan housing for an electric machine includes a housing body for accommodation of the electric machine having a mounting flange for securement to a motor-driven element. The housing body defines a longitudinal axis and includes a cross-shaped or star-shaped configuration in vertical relationship to the longitudinal axis. Thus, when the electric machine is inserted in the fan housing, the corners of the mounting flange of the electric machine for attachment to the motor-driven element remain clear for easy access to screw fasteners.

17 Claims, 4 Drawing Sheets

HOUSING FOR AN ELECTRIC MACHINE WITH AUXILIARY VENTILATION

CROSS-REFERENCES TO RELATED APPLICATIONS

This application claims the priority of German Patent Application, Serial No. 103 53 330.3, filed Nov. 14, 2003, pursuant to 35 U.S.C. 119(a)-(d).

BACKGROUND OF THE INVENTION

The present invention relates, in general, to an electric machine, and more particularly to a fan housing for accommodating an electric machine with external fan.

Nothing in the following discussion of the state of the art is to be construed as an admission of prior art.

Many technical applications require an auxiliary ventilation of an electric machine. A typical example involves a servomotor constructed as permanent magnet synchronous motor for operating machine tools. The arrangement of an auxiliary fan results in a more powerful operation of the motor. Typically, externally ventilated motors are surrounded by a metal jacket so that cooing air is routed in a gap between the metal jacket and the motor housing to provide an effective cooling action. Such a construction is shown by way of example in FIG. 1. A servomotor 1 is enveloped by a metal jacket 2 which is pushed from the rear, i.e. output-distal motor side, upon the servomotor 1. Adjustable rubber pads are used to clamp the metal jacket to the motor housing. Attachment of the servomotor 1 to a motor-driven element such as a machine tool (not shown) is realized by inserting screw fasteners through bores 3 provided at an end face of the servomotor 1. The provision of the metal jacket 2 renders however this assembly difficult as access to the screw heads of the screw fasteners is obstructed. As a result, the assembly is time-consuming and relatively complicated.

It would therefore be desirable and advantageous to provide an improved electric machine with auxiliary ventilation to obviate prior art shortcomings.

SUMMARY OF THE INVENTION

According to one aspect of the present invention, a fan housing for an electric machine includes a housing body for accommodation of the electric machine with its rotation axis, with the housing body defining a longitudinal axis and including a cross-shaped or star-shaped configuration in vertical relationship to the longitudinal axis.

The present invention resolves prior art problems by so constructing the fan housing as to allow easy access to the screw fasteners, e.g. by means of a wrench, for securing the electric machine to a motor-driven element. Thus, attachment of the electric machine is considerably simplified and less labor-intensive.

To ensure clarity, it is necessary to establish the definition of several important terms and expressions that will be used throughout this disclosure. The term "cross-shaped" relates to any configuration that overall resembles a cross. In other words, the arms of the cross may be configured identically or differently. The arms need not necessarily extend perpendicular to one another but may extend at any suitable angular relationship so long as the overall resemblance of a cross is substantially maintained. The term "star-shaped" relates here to a configuration in which the housing is formed about its outer circumference with at least three slits or inwardly recessed zones.

According to another feature of the present invention, the cross-shaped or star-shaped configuration may be substantially constant in a direction along the longitudinal axis of the fan housing. In this way, the fan housing can easily be pushed from the rear onto the electric machine. As an alternative, only one of the opposite axial ends of the housing body may be shaped to include the cross-shaped or star-shaped configuration at a predetermined axial depth. This also provides sufficient accessibility for the screw fasteners, while at the same time providing a stop by which the fan housing can be restrained from moving toward the front. Through provision of the stop, it becomes also possible to position a fan between the stop and a rear wall of the fan housing, so that it is sufficient to mount the fan to the rear wall only, when the fan housing is mounted to the electric machine.

According to another feature of the present invention, the housing body may be constructed of two parts. Currently preferred is a construction with a generally hat-shaped open-ended shell having an opening extending along the longitudinal axis, and a tension plate for closing the opening. A suitable configuration of both parts allows a firm clamping of the fan housing to the electric machine. Manufacturing tolerances can thus be compensated and the need for expensive adjustable rubber pads for clamping the fan housing to the electric machine is eliminated.

According to another feature of the present invention, rubber strips can be placed upon an inside wall surface the housing body at a location of least radial distance to the longitudinal axis of the housing body. As a result of this linear support, coolant is able to stream virtually at the entire surface of the electric machine.

According to another aspect of the present invention, an auxiliary ventilation system in combination with an electric machine includes a housing and fan fitted into the housing, wherein the electric machine has a mounting flange with bores for allowing attachment to a motor-driven element, and is placed into the housing with the mounting flange positioned outside the housing and the fan positioned in proximity of a flange-distal end of the electric machine, wherein fasteners are insertable in the bores for securing the mounting flange to the motor-driven element, and wherein the housing is configured to have recessed zones in the area of the bores to provide accessibility for the fasteners.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
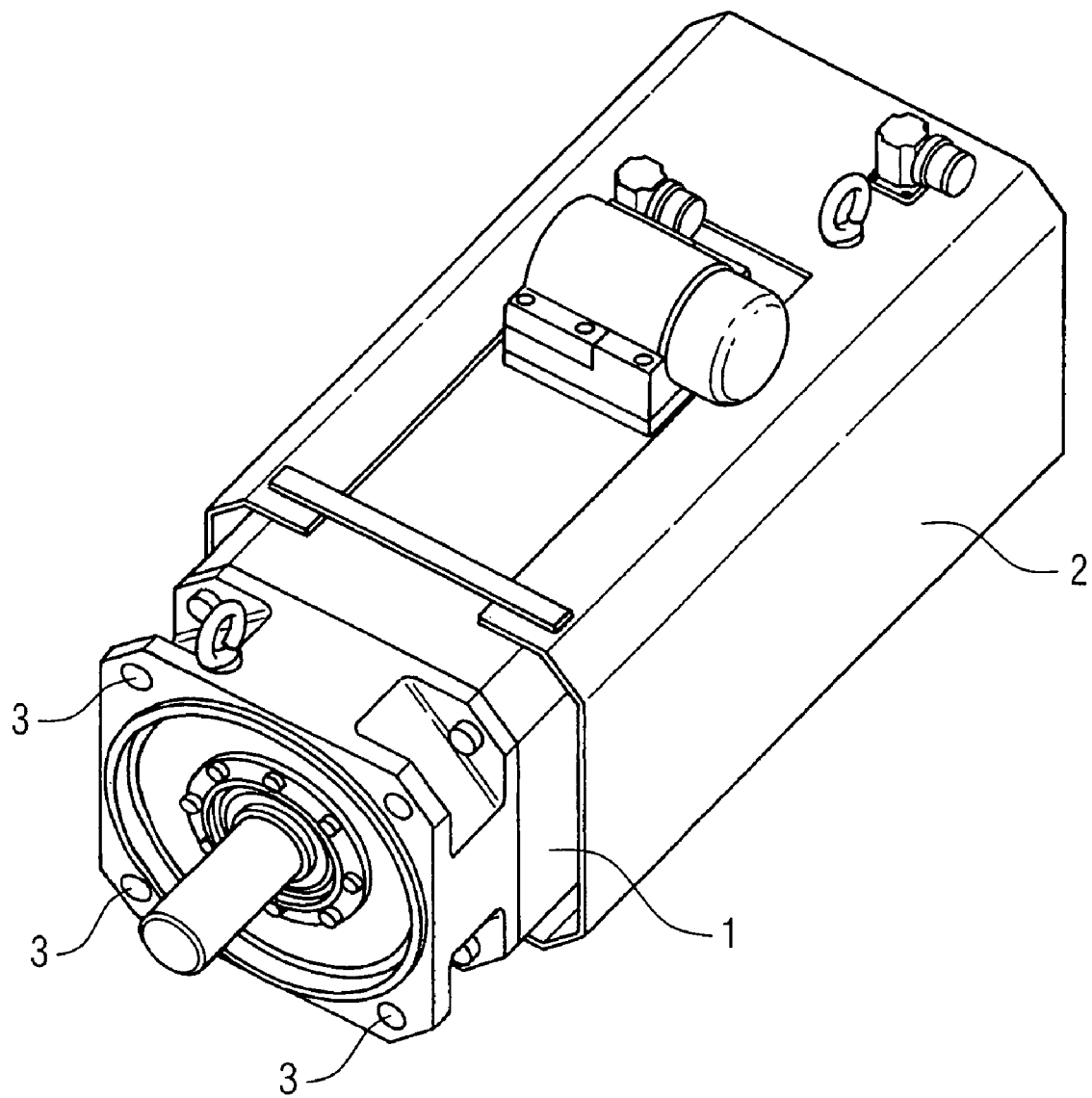
FIG. 1 is a perspective illustration of a servomotor with conventional fan housing.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
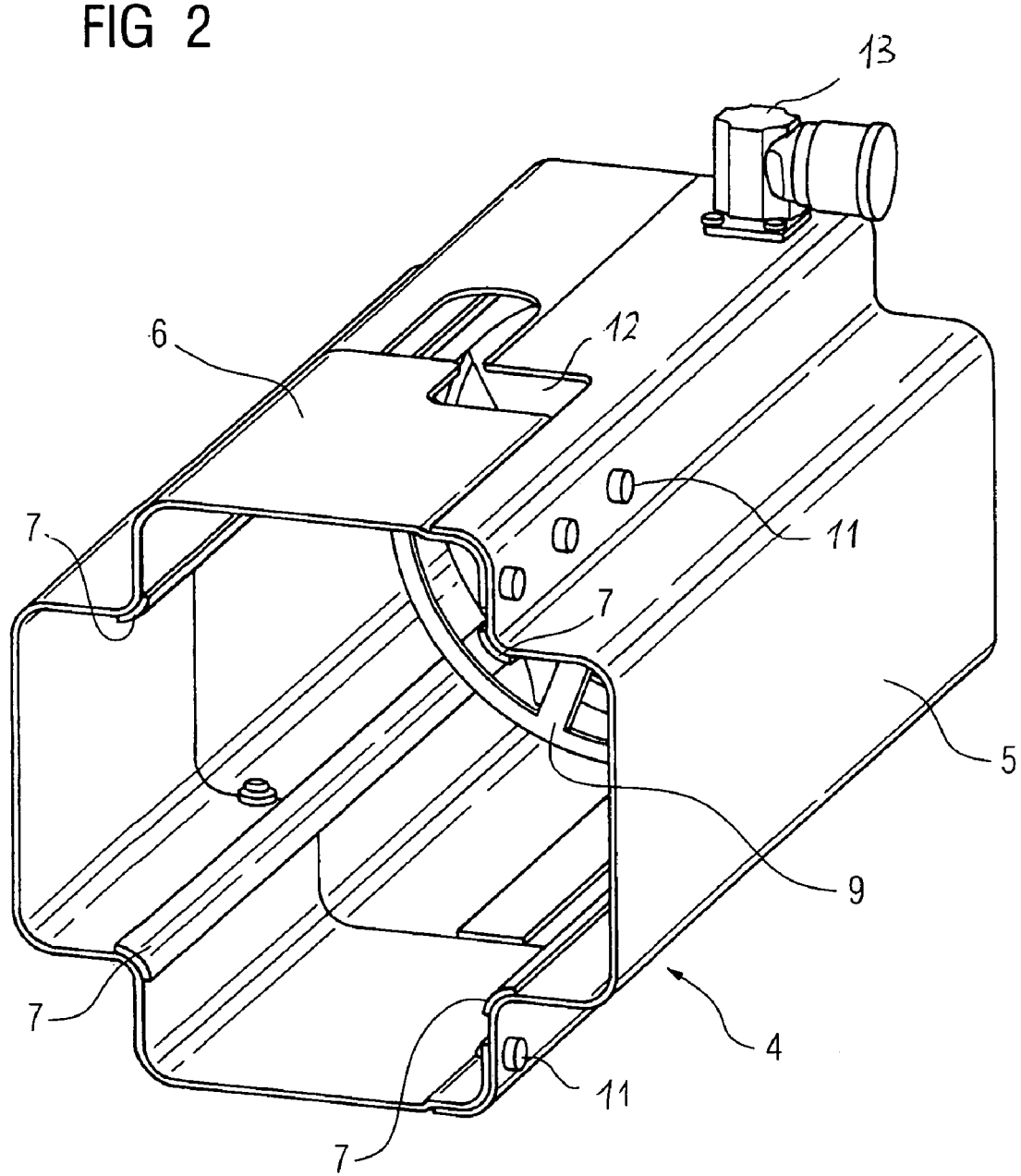
FIG. 2 is a perspective illustration of a fan housing according to the present invention.

Turning now to the drawing, and in particular to FIG. 2, there is shown a perspective illustration of a fan housing according to the present invention, generally designated by reference numeral 4. The fan housing 4 has a housing body of cross-shaped configuration. In other words, the fan housing 4 has an outer circumferential line of a profile resembling a cross. It is also conceivable that the outer circumferential line of the fan housing 4 has a star-shaped configuration, e.g. when the fan housing is used for ventilation of a motor having bores in circumferential spaced-apart relationship for insertion of screw fasteners. In other words, the fan housing 4 can be formed with zones of recessed configuration at least in the area of the bores to enable accessibility for and to the screw fasteners.

Figure 4:
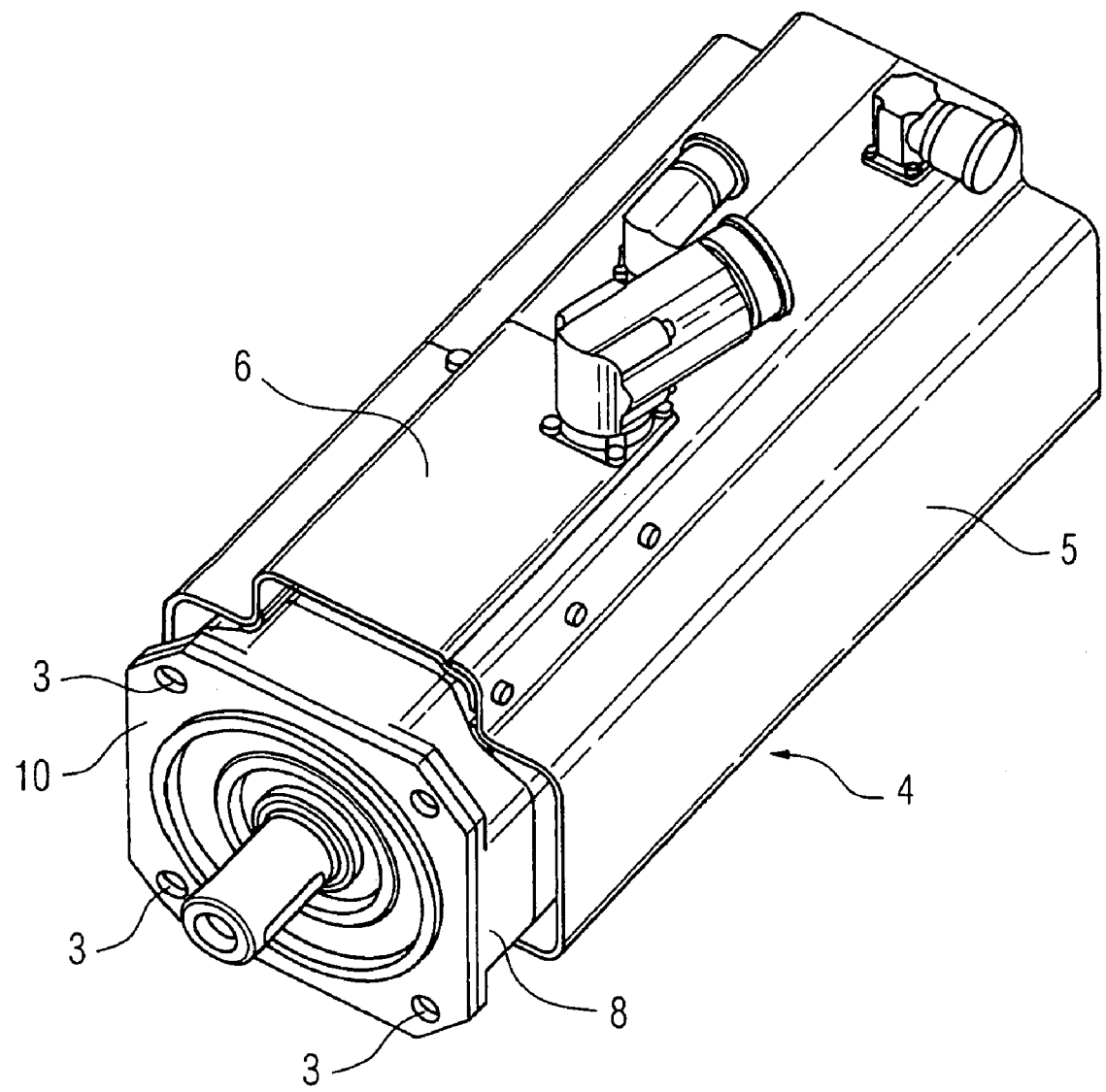
FIG. 4 is a perspective view of a servomotor with a fan housing according to the present invention.

As shown in FIG. 2, the housing body of the fan housing 4 is made of a two-part configuration comprised of an open-ended substantially hat-shaped shell 5 of sheet metal and a tension plate 6 of sheet metal for connection to the shell 5 in the area of the opening by means of screw fasteners 11. Attached to the radially innermost corners of the fan housing 4 are rubber strips 7 by which the fan housing 4 can be clamped upon a motor 8 (FIG. 4). Suitably, the rubber strips 7 are connected, e.g. by gluing, in advance to the shell 5 and the tension plate 6.

The assembled fan housing 4 is formed with openings 12 for placement of plug-type connections 13. The two-part construction of the fan housing 4 allows easy compensation of potential manufacturing tolerances of the shell 5 and the tension plate 6 as well as the motor 8.

Figure 3:
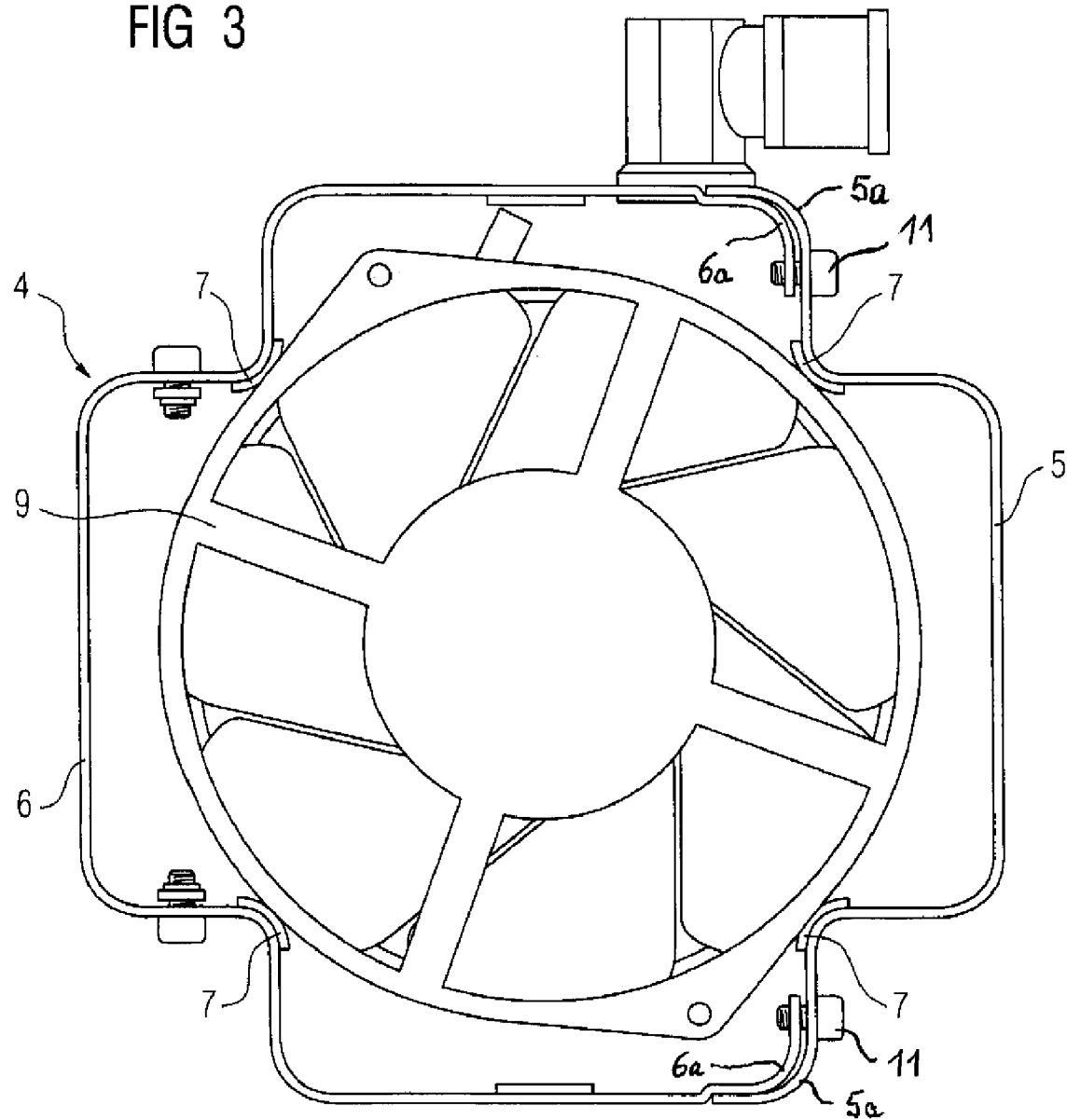
FIG. 3 is a plan view of the fan housing of FIG. 2 along its longitudinal axis.

As shown in FIG. 2 in combination with FIG. 3, which is a plan view of the fan housing 4 along its longitudinal axis, the fan housing 4 accommodates interiorly a fan 9 which is positioned at one end, here the rear wall, of the fan housing 4 and more clearly shown in FIG. 3 which depicts all the components of the fan housing 4, including the rubber strips 7, and illustrates also the securement function assumed by the rubber strips 7 with respect to the fan 9. FIG. 3 further shows that the shell 5 and the tension plate 6 have confronting ends which are disposed in overlapping relationship in substantially coextensive curved sections 5a, 6a, of the shell 5 and the tension plate 6, respectively, and connected together by the screw fasteners 11.

Turning now to FIG. 4, there is shown a perspective view of the electric machine in the form of a servomotor 8 placed inside the fan housing 4 and having a generally tetragonal, here square, mounting flange 10 for attachment of the servomotor 8 to a motor-driven element, e.g. machine tool, via screw fasteners (not shown) that are insertable in the bores 3. As a consequence of the particular contour of the shell 5 and the tension plate 6, i.e. the resultant cross profile, the corner areas of the mounting flange 10 remain clear so that the screw fasteners are easily accessible from outside and from the rear. In other words, the screw fasteners can easily be inserted through the bores 3 for mounting the servomotor 8 to the motor-driven element.

In the event the servomotor 8 needs to be retrofitted with an auxiliary ventilation system, the fan housing 4 according to the invention can easily be pushed over the servomotor, without any modification of the motor contour. The screw fasteners for attachment of the servomotor 8 to a motor-driven element are accessible, regardless whether or not the auxiliary ventilation system is attached.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A fan housing for an electric machine, comprising:
a housing body, contoured to permit the housing body to be pushed over the electric machine without modification to an electric machine contour and to be disposed in surrounding relationship to a rotation axis of the electric machine, thereby forming a gap between the housing body and the electric machine for passage of cooling air, said housing body comprised of two interconnected housing parts constructed to define an access opening to the electric machine, said housing body defining a longitudinal axis and including a cross-shaped configuration in vertical relationship to the longitudinal axis substantially along an entire length of the housing body, wherein the housing parts have confronting ends disposed in overlapping relationship in a direction along the entire length of the housing body;
a plug-type connection placed in an opening of the housing body; and
screw fasteners extending to connect the overlapping confronting ends of the housing parts.

2. The fan housing of claim 1, wherein the cross-shaped configuration is substantially constant in a direction along the longitudinal axis.

3. The fan housing of claim 1, wherein the housing body has opposite axial ends, one axial end being shaped to include the cross-shaped configuration at a predetermined axial depth.

4. The fan housing of claim 1, wherein one of the housing parts is a generally hat-shaped shell having an opening extending along the longitudinal axis, and the other one of the housing parts is a tension plate for closing the opening.

5. The fan housing of claim 1, and further comprising rubber strips placed upon an inside wall surface the housing body at a location of least radial distance to the longitudinal axis of the housing body.

6. The fan housing of claim 1, wherein the housing parts have confronting ends disposed in overlapping relationship in substantially coextensive curved sections of the housing parts.

7. In combination:
an auxiliary ventilation system having a housing and a fan filled in the housing, said housing defining a longitudinal axis and comprised of two interconnected housing parts which have confronting ends disposed in overlapping relationship in a direction along an entire length of the housing;
an electric machine received in the housing and forming a gap between the housing and the electric machine for passage of cooling air generated by the fan, said electric machine having a mounting flange with bores for allowing attachment of the electric machine to a motor-driven element, said mounting flange positioned outside the housing, whereby the fan is positioned opposite to a flange-distal end of the electric machine in rear end of the housing; and fastening means insertable in the bores for securing the mounting flange to the motor-driven element, wherein the housing is configured in the form of a cross to define inwardly recessed zones extending in parallel relationship to the longitudinal axis substantially along an entire length of the housing and in alignment with the bores to provide a space such that corner areas of the mounting flange remain clear for access to the fastening means so as to be insertable into the bores from a backside of the mounting flange that faces the rear end of the housing.

8. The combination of claim 7, wherein one of the housing parts is a generally hat-shaped shell and the other one of the housing parts is a tension plate for attachment to the shell.

9. The combination of claim 8, and further comprising screw fasteners for connecting the shell to the tension plate.

10. The combination of claim 7, and further comprising rubber strips placed upon an inside wall surface the housing at a location of least radial distance to a longitudinal axis of the housing.

11. The combination of claim 7, wherein the housing parts have confronting ends disposed in overlapping relationship in substantially coextensive curved sections of the housing parts.

12. The combination of claim 7, further comprising a plug-type connection placed in an opening of the housing body.

13. An auxiliary ventilation system for an electric machine, comprising:

a housing constructed for accommodation of an electric motor to thereby form a gap between the housing and the electric motor for passage of cooling air generated by the fan, said housing defining a longitudinal axis and comprised of two interconnected housing parts which are constructed to define an access opening to the electric motor and have confronting ends disposed in overlapping relationship in substantially coextensive curved sections of the housing parts in a direction along an entire length of the housing; and a fan secured inside the housing adjacent to an end wall of the housing on an opposite side of the housing from where an output-distal end of the electric motor is disposed, wherein a backside of the output-distal end of the electric motor faces the end wall of the housing, wherein the housing is configured in the form of a cross to define inwardly recessed zones extending in parallel relationship to the longitudinal axis substantially along an entire length of the housing to provide a space for screw fasteners for attachment of an output-proximal forward end of the electric motor from the backside of the output-distal end of the electric motor.

14. The ventilation system of claim 13, wherein one of the housing parts is a generally hat-shaped shell and the other one of the housing parts is a tension plate for attachment to the shell.

15. The ventilation system of claim 14, and further comprising screw fasteners for connecting the shell to the tension plate.

16. The ventilation system of claim 13, and further comprising rubber strips placed upon an inside wall surface the housing at a location of least radial distance to a longitudinal axis of the housing.

17. The ventilation system of claim 13, further comprising a plug-type connection placed in an opening of the housing body.

\* \* \* \* \*